US012282568B2

(12) United States Patent
Findlay et al.

(10) Patent No.: US 12,282,568 B2
(45) Date of Patent: Apr. 22, 2025

(54) SYSTEM, DEVICE AND METHOD FOR PROCESSING DATA

(71) Applicant: Sita Information Networking Computing USA, Inc., Atlanta, GA (US)

(72) Inventors: Denise Findlay, Middlesex (GB); Harold Clements, Middlesex (GB)

(73) Assignee: SITA Information Networking Computing USA, Inc., Atlanta, GA (US)

(*) Notice: Subject to any disclaimer, the term of this patent is extended or adjusted under 35 U.S.C. 154(b) by 30 days.

(21) Appl. No.: 16/955,619

(22) PCT Filed: Dec. 19, 2018

(86) PCT No.: PCT/IB2018/060385
§ 371 (c)(1),
(2) Date: Jun. 18, 2020

(87) PCT Pub. No.: WO2019/123341
PCT Pub. Date: Jun. 27, 2019

(65) Prior Publication Data
US 2021/0097188 A1 Apr. 1, 2021

(30) Foreign Application Priority Data
Dec. 21, 2017 (GB) .................... 1721551

(51) Int. Cl.
*G06F 21/60* (2013.01)
*G06F 16/22* (2019.01)
(Continued)

(52) U.S. Cl.
CPC ........ *G06F 21/604* (2013.01); *G06F 16/2282* (2019.01); *G06F 16/288* (2019.01);
(Continued)

(58) Field of Classification Search
CPC .. G06F 21/604; G06F 16/2282; G06F 16/288; G06F 21/31; G06F 21/6227;
(Continued)

(56) References Cited

U.S. PATENT DOCUMENTS 5,481,700 A  1/1996 Thuraisingham
5,572,673 A  11/1996 Shurts
(Continued)

FOREIGN PATENT DOCUMENTS

EP   3073671 A1   9/2016
WO  2016037496 A1   3/2016

OTHER PUBLICATIONS

Examination Report issued by the United Kingdom Intellectual Property Office in Application No. GB1721551.8, dated Mar. 28, 2019 (4 pages).
(Continued)

*Primary Examiner* — Harunur Rashid
(74) *Attorney, Agent, or Firm* — Morris, Manning & Martin, LLP; Daniel E. Sineway, Esq.; Adam J. Thompson, Esq.

(57) ABSTRACT

A computer processing device for data processing is disclosed. The device is configured to determine a trust level associated with a data requestor, determine a data category associated with one or more data elements wherein each data category has an associated ranking, construct a set of data elements for the data requestor from the one or more data elements based on the determined ranking associated with each data category and the determined trust level associated with the data requestor.

18 Claims, 3 Drawing Sheets

(51) Int. Cl.
*G06F 16/28* (2019.01)
*G06F 21/31* (2013.01)
*G06F 21/62* (2013.01)

(52) U.S. Cl.
CPC .......... *G06F 21/31* (2013.01); *G06F 21/6227* (2013.01); *G06F 2221/2113* (2013.01); *G06F 2221/2141* (2013.01)

(58) Field of Classification Search
CPC ..... G06F 2221/2113; G06F 2221/2141; G06F 16/335; G06F 21/62; G06F 21/6218; H04L 63/083; H04L 63/104; H04L 63/105
See application file for complete search history.

(56) References Cited

U.S. PATENT DOCUMENTS

| | | | |
|---|---|---|---|
| 11,516,251 B2* | 11/2022 | Zurko | H04L 63/20 |
| 2003/0154171 A1* | 8/2003 | Karp | G06Q 30/02 |
| | | | 705/78 |
| 2006/0206485 A1 | 9/2006 | Rubin et al. | |
| 2009/0030907 A1 | 1/2009 | Cotner et al. | |
| 2012/0246150 A1* | 9/2012 | Comi | G06F 16/21 |
| | | | 707/E17.014 |
| 2012/0291137 A1 | 11/2012 | Walsh et al. | |
| 2013/0159021 A1* | 6/2013 | Felsher | G16H 10/60 |
| | | | 705/3 |
| 2014/0096199 A1 | 4/2014 | Dave et al. | |
| 2015/0205969 A1 | 7/2015 | Richman | |
| 2016/0191464 A1* | 6/2016 | Hansen | H04L 63/02 |
| | | | 726/23 |
| 2016/0210464 A1* | 7/2016 | Näslund | G06F 16/22 |
| 2016/0313957 A1* | 10/2016 | Ebert | H04W 4/02 |
| 2016/0353062 A1* | 12/2016 | Ono | G06V 40/172 |
| 2017/0155659 A1* | 6/2017 | Baltar | H04L 63/105 |
| 2017/0168521 A1* | 6/2017 | Suh | G06F 1/12 |
| 2018/0352034 A1* | 12/2018 | Mutreja | H04L 63/20 |
| 2019/0155940 A1* | 5/2019 | Lecue | G06Q 10/04 |

OTHER PUBLICATIONS

International Search Report issued in International Application No. PCT/IB2018/060385, mailed Aug. 13, 2019 (4 pages).
Written Opinion of the International Searching Authority issued in International Application No. PCT/IB2018/060385, mailed Aug. 13, 2019 (7 pages).

* cited by examiner

SYSTEM, DEVICE AND METHOD FOR PROCESSING DATA

CROSS-REFERENCE TO RELATED APPLICATIONS

This application is a National Stage application of, and claims the benefit of and priority to, International Patent Application No. PCT/IB2018/060385, filed Dec. 19, 2018, entitled "SYSTEM, DEVICE AND METHOD FOR PROCESSING DATA," which claims priority to Great Britain Application No. 1721551.8, Dec. 21, 2017, and entitled "SYSTEM, DEVICE AND METHOD FOR PROCESSING DATA," all of which are incorporated by reference herein in their entireties.

FIELD OF THE INVENTION

This invention relates to a system, apparatus, method or computer program for processing data. More particularly, this invention relates to a system, device and method for secure data sharing.

In particular, but not exclusively, this invention relates to processing of data associated with the handling of baggage at airports, seaports, railways, and other mass transport locations.

However, it will be appreciated that embodiments of the invention may be applied to any data ecosystem and is therefore not limited to the air transport industry.

BACKGROUND OF THE INVENTION

Conventional data processing systems, particularly baggage data processing systems, do not provide a platform that sets rules and controls how data is used and by whom.

This means that data of a private, sensitive, commercial and operational nature are stored together in the same database tables and sent in the same events. This restricts the ability to give other parties access to operational data, for example, because these third parties may also have access to personal data or other sensitive data.

SUMMARY OF THE INVENTION

The inventors have appreciated that in order to achieve data collaboration with airports, and airlines and other users of operational data, operational data of certain categories of data need to be treated differently from other categories of data.

Embodiments of the invention seek to address the above problems by managing data elements according to categories. This enables different types of data to be shared in for example, the Air Transport Industry.

Further, embodiments of the invention seek to address the above problems by providing a trust framework for managing access to data and for providing access rules to be followed.

Further, embodiments of the invention are based on an architecture which facilitates creating a product agnostic framework that allows customers, users or data requestors to both protect their personally identifiable information data and share their message data with selected partners according to the rules.

Thus, embodiments of the invention provide a system which gives users such as airlines and airports confidence to share their data for the purposes of improvements to operations and customer service.

By placing a pre-application module at the core of the architecture structure, embodiments of the invention remove the need for bespoke pre-application modules as well as unifying the authentication and authorisation tokenising. All microservice requests from the API gateway are automatically be parsed through the Trust Layer or in other words the trust API 123. This allows for more granular filtering of data received by application 125, or data sent by application 125 (in, out or both) using the application 125. Application 125 may have the functionality of filtering out one or more data elements from returned data if the application 125 determines that the caller is not authorised to view specific elements.

Embodiments of the invention may use a hierarchical data taxonomy approach. One of the advantages of using this hierarchical data taxonomy approach is that it is very extensible. If a new data element is created and assigned to an existing category, the trust framework can automatically and seamlessly apply the new data element using the customers' existing preferences, without any intervention from the system administrator or customer.

According to a first aspect of the present invention, a computer processing device for data processing, the device comprising: receiving means or receiver for receiving data identifying a data requestor and for receiving a search key associated with the received data identifying the data requestor wherein the processing device is configured to: determine a trust level associated with the data requestor; receive one or more data elements associated with the search key; determine a data category associated with each data element wherein each data category has an associated ranking; construct a set of data elements for the data requestor from the received one or more data elements based on the determined ranking associated with each data element or data category and the determined trust level associated with the data requestor.

According to a further aspect, a computer processing device for data processing is provided. The device comprises a storage means for storing data associated with one or more events wherein each event is defined by one or more data categories and preferably wherein each data category has an associated data owner or data source field.

Accordingly, embodiments of the invention may provide a direct association between a data category and ranking, rather than between data element and ranking. This provides a fine level of granularity of data filtering.

BRIEF DESCRIPTION OF THE DRAWINGS

An embodiment of the invention will now be described, by way of example only, and with reference to the accompanying drawings, in which.

DETAILED DESCRIPTION

The following description is of a system for use in the aviation industry, but this is exemplary and other applications of the invention will also be discussed. For example, the system may be used in other travel industries, such as rail, coach, car, or indeed in any environment or industry where access to data needs to be managed.

Additionally, the following embodiments described may be implemented using a C++ programming language using for example an OpenCV library. However, this is exemplary and other programming languages known to the skilled person may be used such as JAVA, and .xml.

Figure 1:
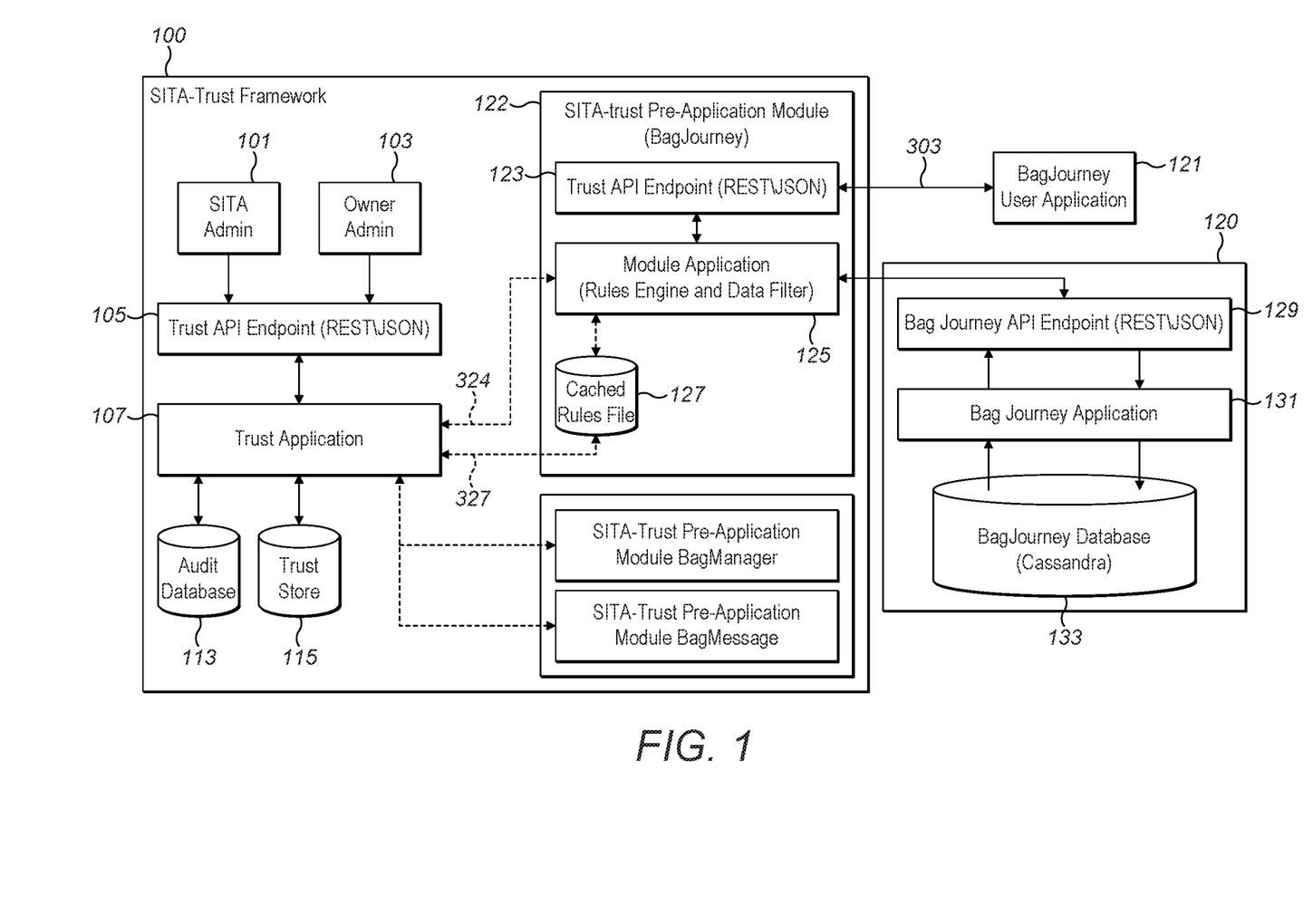
FIG. 1 is a schematic diagram of the main functional components embodying the invention.

Turning to now FIG. 1 this may be thought of as a logical level view of the different functional components. It should be noted that embodiments of the invention do not require all of the different functional components shown in FIG. 1. For example embodiments of the invention may reside within the functional component 100, or within the functional application or component 120 or within the user application 121. The functional component 100 is usually embodied in a computer or server. In the exemplary structure of FIG. 1 the application 121 is shown outside the functional component 120, but alternatively the application 121 may be integrated within the functional component 120.

One or more of the functional components shown within label 100 are usually embodied within a virtual private cloud. Access to the cloud may be secured by username and password. Usually, the cloud is provided on one or more computers or servers. In the embodiment shown in FIG. 1, the application 120 is usually embodied in a computer or server which is communicatively coupled to a further computer or server providing the trust functionality shown within component 100. Further, an application 121 running on a computing device used by user or data requestor is communicatively coupled to any one or more of the functional components shown in FIG. 100 although in the example implementation shown in FIG. 1, the application is communicatively coupled to a pre application module 122, and the communication may be via an Application Programming Interface, API 123.

Once specific example of a cloud which may embody functional aspects of this invention is an Amazon™ Web Services cloud or Virtual Private Cloud. In this, different IP address ranges may be selected, subnets may be created, route tables and network gateways may be configured.

The following description assumes that data elements stored in a bag journey database 133 are assigned an owner or in other words a data source and a category. In other words, each data element may be associated with an owner and optionally a category.

For the avoidance of doubt, the data owner data and category may be optionally stored in the bag journey database 133, but however it usually stored in separate trust store database 115 so that this data can be separately managed by the trust administrator 101.

The data owner may be thought of as the party or system providing the data. The owner may defined by an alphanumeric string such as "Airline DCS" or "Airport Scanner" or another party or event station.

Similarly, a category associated with each data element may be defined. Four different data categories may be defined:

1. Cloud service customer data (also referred to as customer content data);
2. Cloud service derived data (also referred to as derived content data);
3. Cloud service provider data (also referred to as service provider data); and
4. Account data.

Account data is usually the data belonging to the customer such as an airport (e.g. Heathrow Airport, LHR) regarding billing for providing the service and so on.

Each of these categories may be further sub-divided with definitions of sub-sets of related data objects. Further sub-division is also possible. Further categories may also be defined. For example, additional air transport specific categories such as an Airport Information category may also be defined The data categories may be defined in a hierarchical structure with a single inheritance/sub-type relationship. In other words the data categories may be defined according to a tree data structure.

In one specific example, baggage message data may be categorised in the following way according to Table 1 below:

TABLE 1

An exemplary categorisation of baggage message data according to a specific embodiment of the invention. Usually, these categories map to the ISO 19944 standard which relates to information technology, cloud computing, cloud services and devices, data flow, data categories and data use.

| Owner | Data Element | Category | PII | CS |
|---|---|---|---|---|
| Airline | PNRAddress | CustomerContent\Credentials | Y | |
| Airline | PassengerName | CustomerContent\General | Y | |
| Airline | GroupName | CustomerContent\CustomerContactList | | |
| Airline | FrequentFlier | CustomerContent\Credentials | Y | |
| Event Station | BagTagPrinterID | DerivedContent\ObservedUsageOfServiceCapability | | |
| Event Station | BaggageExceptionData | CustomerContent\General | | |
| Airline | BagCheckInData | DerivedContent\ObservedUsageOfServiceCapability | | |
| Event Station | BagCheckInData\LocationID | DerivedContent\UserLocation | | |
| Airline | ReconciliationData\SeatNumber | DerivedContent\EUII | Y | |
| Event Station | ReconciliationData | CustomerContent\General | | |
| Event Station | ChangeofStatusIndicator | CustomerContent\General | | |
| Event Station | BaggageIrregularities | CustomerContent\General | | |

TABLE 1-continued

An exemplary categorisation of baggage message data according to a specific embodiment of the invention. Usually, these categories map to the ISO 19944 standard which relates to information technology, cloud computing, cloud services and devices, data flow, data categories and data use.

| Owner | Data Element | Category | PII | CS |
|---|---|---|---|---|
| Airline | OutboundFlightInformation | CustomerContent\General | | |
| Airline | OutboundFlightInformation\Class | CustomerContent\General | | Y |
| Airline | GroundTransport | DerivedContent\EUII | | |
| Airline | GroundTransport\Address | DerivedContent\EUII | Y | |
| Event Station | HandlingLocation | CustomerContent\General | | |
| Airline | InboundFlightInformation | CustomerContent\General | | |
| Airline | InboundFlightInformation\Class | CustomerContent\General | | Y |
| Event Station | ProcessingInformation | CustomerContent\General | | |
| Event Station | DefaultMessagePrinter | CustomerContent\General | | |
| Event Station | BagTagDetails | CustomerContent\EUII | | |
| Event Station | LoadSequenceNumber | CustomerContent\General | | |
| Airline | InternalAirlineData | CustomerContent\General | | |
| Event Station | ReconciliationData | CustomerContent\General | | |
| Event Station | LoadingData | CustomerContent\General | | |
| Event Station | PiecesAndWeightData | CustomerContent\General | | |
| Event Station | BaggageSecurityScreening | CustomerContent\General | | |
| Event Station | VersionAndSpplementaryData | CustomerContent\General | | |
| SITA | StandardMessageIdentifier | ServiceProvider\AccessControlData | | |
| Event Station | ChangeOfStatusIndicator | CustomerContent\General | | |
| Event Station | GateNumber | AirportInformation\General | | |

Newly defined data categories may also be defined, such as gate number or information, GateNumber. This is usually defined by an alpha-numeric string such as "B43" which may be associated with a particular physical location at an airport from where a particular airplane departs. According to table 1, this data is categorised according to the category "AirportInformaiton" and in a sub category of "General".

In a similar manner, individual data elements associated with particular baggage events may be categorised according to Table 2 below. It will be seen that in Table 2, one data element defines or is associated with a baggage event which indicates that a particular flight and hence a bag loaded into the hold of that flight, has departed from a particular airport. This is defined by the data element or key "BagItinerary\Departed_from". A value associated with this event may be defined for example by an alpha-numeric string such as "LHR" which indicates that the bag has departed from an airport such as London Heathrow:

TABLE 2

An exemplary categorisation of baggage events according to a specific embodiment of the invention.

| Owner | Data Element | Category | PII | CS |
|---|---|---|---|---|
| SITA | BagItinerary\id | ServiceProvider\OperationsData | | |
| SITA | BagItinerary\Departed_from | ServiceProvider\General | | |
| Airline | BagItinerary\PNR | CustomerContent\Credentials | Y | |
| Airline | BagItinerary\Surname | CustomerContent\General | Y | Y |
| SITA | BagItinerary\MasterBagId | ServiceProvider\OperationsData | | |
| SITA | BagItinerary\TagType | ServiceProvider\General | | |
| SITA | BagTag_Events\Event_Date | ServiceProvider\Operations | | |
| Airline | Event_Details\Airport | CustomerContent\General | | |
| SITA | Event_Details\DateTime | ServiceProvider\Operations | | |
| Airline | Event_Details\FlightInfo\Outbound | CustomerContent\General | | |
| Airline | Event_Details\FlightInfo\Onward | CustomerContent\General | | |
| SITA | Event_Details\EventCode | ServiceProvider\Operations | | |
| SITA | Event_Details\EventDesc | ServiceProvider\Operations | | |
| Airline | Event_Details\PNR | CustomerContent\EUII | Y | |
| Airline | Event_Details\FreqFlyerId | CustomerContent\Credentials | Y | Y |

TABLE 2-continued

An exemplary categorisation of baggage events according to a specific embodiment of the invention.

| Owner | Data Element | Category | PII | CS |
|---|---|---|---|---|
| Event Station | Event_Details\ReadLocId | CustomerContent\General | | |
| Event Station | Event_Details\SentToLocId | CustomerContent\General | | |
| Event Station | Event_Details\StowageDeviceId | CustomerContent\General | | |
| Event Station | Event_Details\airCompId | CustomerContent\General | | |
| SITA | Event_Details\rawMsg | ServiceProvider\Operations | Y | Y |
| SITA | Location_Events\customerId | ServiceProvider\AccountData | | Y |
| | Location_Events\Airport_code | | | |
| SITA | Location_Events\Event_code | ServiceProvider\Operations | | |
| SITA | Loction_Events\Event_description | ServiceProvider\Operations | | |
| SITA | Location_Events\Location_Ids | ServiceProvider\General | | |
| SITA | Location_Events\Location_type | ServiceProvider\General | | |
| SITA | Location_Events\ Location_event_priority | ServiceProvider\General | | |
| SITA | Customer | ServiceProvider\AccountData | Y | Y |

Each of the owner, data element, category, PII, and CS may be defined by a key value pair.

For both Tables 1 and 2 above, it will be seen that for each data element, an associated optional field defining whether the data element relates to Personally Identifiable Information (PII) may be provided. Furthermore, for each data element, an associated optional further field defining whether or not the data element is sensitive (CS) or not may be provided.

Thus, it will be appreciated that data elements may be categorised into one or more different sub-categories of data elements, for example be operational data, general data, or End User Identifiable Information, EUII data and so on. Similar categories may be assigned to data elements used to allow wireless devices to record tracking events over the internet to enable bags and their associated events to be tracked.

A number of different actors or parties may use the system. Table 3 below shows these different parties and provides a brief description along with some examples:

TABLE 3

Users of the system.

| Actor | ISO Term | Description | Examples |
|---|---|---|---|
| Data Authority | | The party that determines the rules by which the data will be shared. Note the data authority is not necessarily the owner of the data and will not necessarily have the right to view the data if a more restrictive rule is in place. For example AirCanada ™ is data authority for all the data relating to their passenger bags for the entire journey. Heathrow is the data authority for event station data at Heathrow. Heathrow and AirCanada ™ will have to communicate to enable sharing of data. | SITA Airline Airport |
| Data Owner | Source | The party that provides the data. The data provided by the owner is always viewable by the owner. | Airline DCS Airport Scanner |
| Data Processor | Service Provider | The party providing a data processing data service on behalf of the owner | SITA |
| Event Station | | Where the event that produces data has taken place usually the airport | Airport scanner location |
| Event Airline | | The airline currently responsible for transporting the bag generally the departing airline | Airline |
| Accessing Entity | Customer Airport Airline | A party with permission to access the data | Partner Airlines |

The following description assumes that each data element is assigned to a data authority. The data authority may determine access rules for the data which determine whether each data element can be shared with third parties.

Thus, usually, each data element belongs to, or is associated with one or more data authorities. The data authority usually stores one or more rules, for example in a database, which determine who can access the data, what they can access, when access is enabled, how they can access the data and for what purpose. The database may be updated by the data authority.

Further, the data authority may assign ownership of the data elements. In other words, each data element is usually associated with a particular source, such a system or device which provides the data. The data authority also usually categorises each data element.

The data owner or source may specify who can use their data, via which channel, when it can be used and for what purpose. For example the data owner may specify that personal data may only be accessed via a secure channel whereas operational data may be accessed via an unsecured internet connection. The data authority may then specify appropriate rules to implement how the data is used.

The party requesting access to the data may be referred to as a data requestor, data user or customer. For example, the party accessing the data may be an airport such as London Heathrow or London Gatwick, but in principle, any party may use the system to access the data, such as an individual airline or other user if they are authorised to do so. The party accessing the system may be (uniquely) identified by a userid or customer ID and this may be associated with entities other than an airport or an airline, such as a ground handler.

If a secure channel, such as wired or wireless internet, is used to communicate the data, an identifier or means is provided to indicate that a secure channel has or will be used. Finally, the following description also assumes that the data owner cannot restrict the Data Authority access to the data.

Usually, a database, referred to as a Trust Database is provided to store information or data. Usually, the database is stored in a storage means such as a random access memory. The database may be structured as follows:
1. The data authority has a number of different users such as an airline or an airport;
2. Each user is assigned a trust level by the data authority. The trust level may for example be Low, Medium or High;
3. Each trust level has one or more categories associated with it;
4. Categories contain the name of the data elements. The data elements may be thought of as the granular pieces of information contained in an event such as a Bag Event. Some exemplary bag events are shown in table 2 above.

The trust level may also be referred to as a sharing levels. A user or customer can select which categories or events they wish to share with their most trusted partners and group them at a 'High' level. They may also wish to have an intermediate level of sharing where 'Medium' can be selected. By default, categories/event not assigned to 'High' or 'Medium' will be assigned the lowest level of sharing (Low).

The same process of High/Medium/Low is used to group a customer or user's partners for applying categories grouping. Users may also group their staff into the same High/Medium/Low levels of sharing. A further filtering of Personally Identifiable Information and sensitive data may also be applied to the response data set.

System Operation

An embodiment of the invention will now be described referring to the architecture view of FIG. 1 of the drawings, the flow chart of FIG. 2 and the message sequence flow diagram of FIG. 3. The following description assumes that the exemplary bag journey functionality shown as components 129, 131, and 133 are implemented on a separate computer or server 120 to the SITA trust functionality 100 shown in FIG. 1. Of course, the functionality of components 129, 131, 133 may be provided within the trust functionality 100, which means that the data is communicated to the bag journey application 131 by any suitable communication means, without the need for the API 129.

Figure 3:
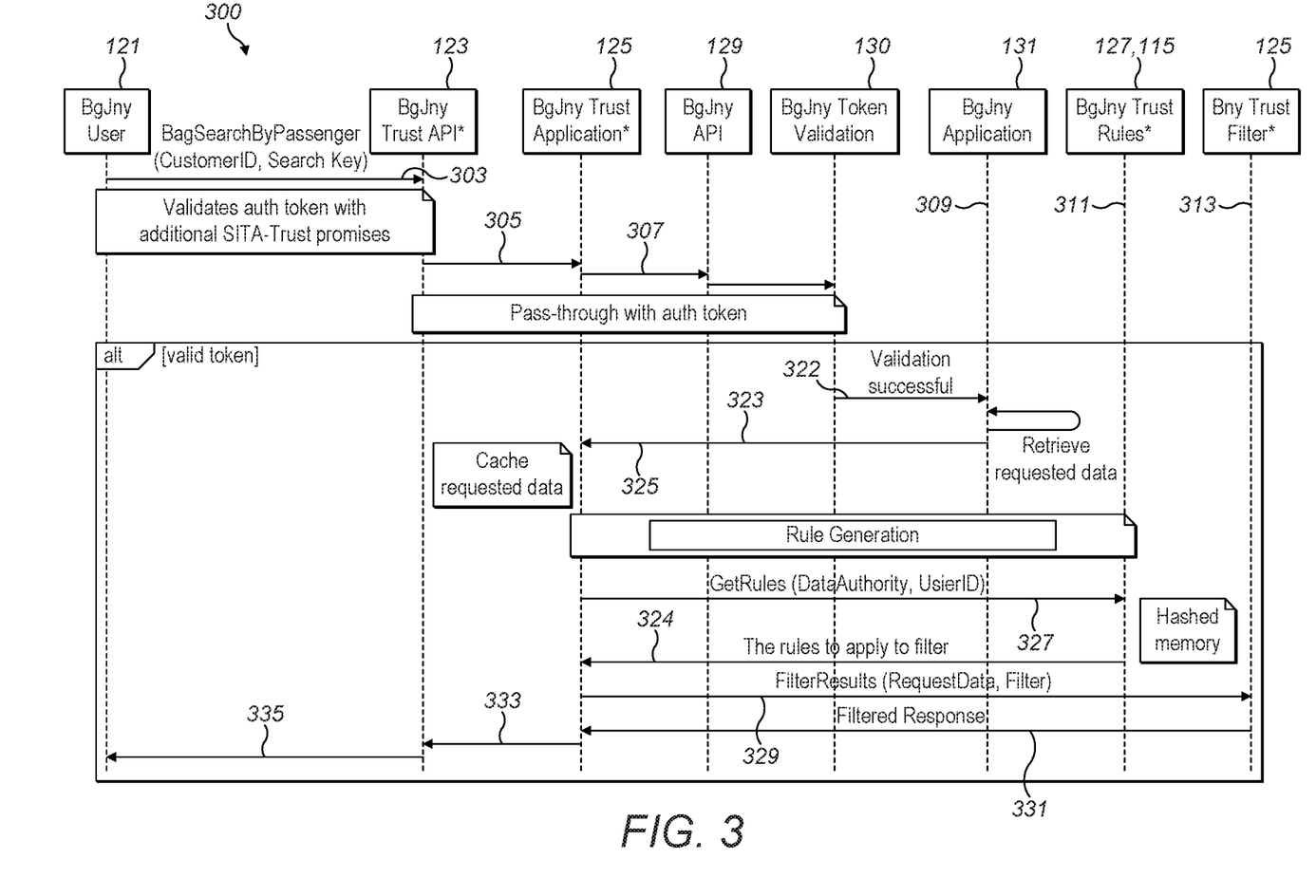
FIG. 3 is a sequence flow diagram showing the various messages or calls which are made between various different functional components.

Referring first to FIG. 3, this is a diagram showing how the different functional components communicate with each other, using wired or wireless communication protocols which will be known to the skilled person. The protocols may transmit service calls, and hence data or information between these components, and these calls are usually represented as arrows, with the direction of the arrow indicating the functional component to which the call is made. In one specific example, the calls between the different functional components shown in FIG. 1 and FIG. 3 of the drawings are REST\JASON API calls. However, it will be appreciated that within specific applications or functional components shown in FIG. 1, that a communicative connection may be sufficient to allow data exchange so that the API calls are not needed. It will be seen that a separate functional component referred to as a trust filter is shown in FIG. 3, but the functionality of the filter is usually performed within the module application 125, and therefore the same reference numeral 125 has been used for the functionality of the application 125 and filter.

With reference to FIG. 1 of the drawings, an accessing entity, such as an airline or user wishing to access the data first launches an application 121 on a computing device, such as a mobile communication device such as a telephone, or laptop. In the flow diagram of FIG. 2, the launching of the application is indicated by step 201. The application usually includes an application programming interface, API.

The user then enters a customer identifier, referred to as CustomerID or user ID into the application 121 and password and is either then locally or remotely authenticated.

For example, the API running on the application 121 may make a REST\JSON API authentication call over HTTPS to a remote computer or server 100 running an authentication module, usually via an API endpoint 123. Alternatively a SOAP XML Web Service call may be used.

The authentication call from the user's computing device or mobile device 121 to the pre application module 122 may be protected by an API authentication Key token, and this token is usually added as part of the authentication call to the pre application module 122. The following pseudocode shows an exemplary authenticate token:

```
{
"type": "JWT",
"alg": "HS256"
}
{
"iss": "www.trust.sita.aero",
"jti": "5285fcbe-6e48-4fb7-81fa-bf6d387a1d99",
"exp": "1539789587",
```

```
"sub": "auth",
"userid": "LHR",
"dataauth":["AC", "BA","UX"],
"categories": {
"message": "2147483648",
"event" "268435456',
"request":"16,384",
"response:"1024"
}
}
.9D0281E511FD226445683A188F4E33D8ED7EACC6596A84A7D130C7C273176BF2
```

This exemplary token comprises information or data, such as alpha-numeric data. In this example the data is defined by key value pairs which is in an .XML format although other formats will be known to the skilled person. The data may comprise any one or more of the key value pairs shown above such as data identifying the user, accessing entity, or data requestor, referred to as userid.

In this specific example, it can be seen that the user or customer identifier is LHR, or in other words that the user identifier is a unique identifier associated with an airport, such as London Heathrow.

Further, it can be seen that in the above exemplary token, the data authority is either Air Canada™ (AC), British Airways™ (BA), Air Europa™. (UX). Of course, in principle, one, two or more data authorities may be indicated in the key.

In this way, the token is related to the data authority. For example, if Air Canada is the data authority then Air Canada may set Heathrow as a viewer or user of their data. Therefore the token not only identifies the user but also the data authority and therefore allows the system to determine which rules to apply. For example Heathrow may have a token with a body of relationships with data authorities. The rules, described in further detail below, may be embedded within the token, although this is not shown above. Thus, a key may be embedded in the token (i.e LHR.GroundStaff). The key may be used to search a database to determine the particular authorisations to view.

Thus, when logging on, the user usually states what data authority is associated with the data or what data authority can be assumed from the returned data.

Once the user has been authenticated, the application 121 running on the user's mobile device then allows the user to request data.

To achieve this, the user usually also supplies, and enters into the device running the application 121 some additional data such as a master bag identifier, referred to as MasterBagID. The MasterBagID, also referred to as master_bag_id. The master_bag_id key usually has an associated value. This may be an alpha-numeric string according to the following exemplary format:

```
| master_bag_id                          |
|----------------------------------------|
| 65553ef8-0963-49d1-a333-0812473834a0   |
| 65553ef8-0963-49d1-a333-0812473834a0   |
```

Other formats such as an identifier=12555 may be used. A Licence Plate Number, LPN may be associated with an item of baggage. Thus, the master_bag_id is usually associated with an LPN. Each item of baggage or LPN is usually associated with a passenger.

The data, such as the customer or user identifier and master bag identifier, is then communicated from the user application 121 to the API endpoint 123 by way of a service call 303.

It will be appreciated that in fact as part of the call 303 any database key and associated value may be communicated in the call 303. In the above specific example relating to data associated with baggage, the master_bag_id is the database key that gives access to the data for a particular bag. The service call may be referred to as a BagSearchByPassenger service call 303 which then communicated, by service call 305 from the API 123 to the module application 125, also referred to as bag journey trust application 125.

Although in the example shown in FIG. 1, only a single pre application 122 is shown, in fact a number of different pre application modules may be provided. For example, one pre-application module or internal API may be provided for different types of requests received from the user application. Within the computer or server 100, a module may be provided which determines the type of request being received from a user application based on the type of data defined in the request. The request may then be transferred to the appropriate application module for processing, as described in more detail below.

Figure 2:
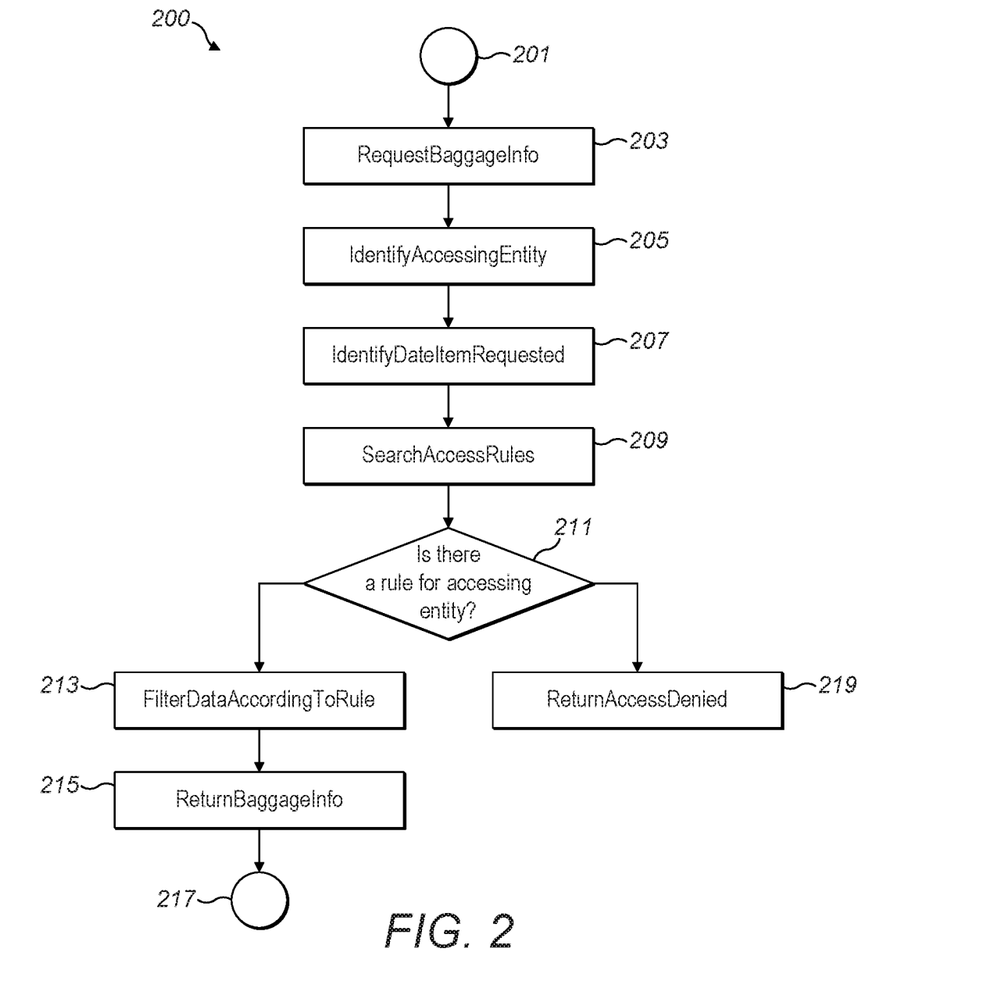
FIG. 2 is a flow diagram showing the steps performed by an embodiment of the invention.

In the flow chart of FIG. 2, the step of requesting baggage information is labelled as step 203.

The module application 125 then sends the data which usually includes the user identifier or data requestor identifier and associated search key, usually as a data pass-through with the previously described authentication token to the bag journey API endpoint 129 by way of a service call, such as a REST\JSON call 307. The authentication token is optional.

Although not shown in FIG. 1, usually the token received by the computer or server, or functional component 120 is validated using a token validator 130 shown in FIG. 3.

The data, which usually comprises the user or requestor identifier and associated search key or bag identifier is communicated, via call 322, to the bag journey application 131 from the API endpoint 129.

Assuming token validation is successful, in response to receiving the user or requestor identifier and the associated search key, the bag journey application 131 queries the database 133, usually using a service call, although this is not shown in FIG. 3. Subsequently, the authenticated token is usually no longer needed.

The query to the database 133 is usually referred to a Cassandra query, which may be implemented using the CQL language which will be known to the skilled person. The query usually extracts EventData for the master_bag_ID supplied, or in other words EventData associated with the master_bag_ID. It will be appreciated that the Masterbag identifiers are usually unique. This means that the customerID is not required to query the Bagjourney database.

Once a matching key has been located in the database, the data associated with the matching key, which is stored in the database, is returned to the bag journey application, usually by way of a service call.

In principle, just a single piece of data or data element may be returned to the bag journey application, but usually, a plurality of data elements, each data element being associated with an event, such as those described above with reference to Table 2 is returned, usually as key value pairs.

The bag journey application 131 returns the data associated with the customer identifier or/and the master bag identifier in to the bagjourney API 129 call by call 323. The bagjourney API 129 then passes the data in the call on to the bag journey module application 125 by way of a further service call 325. Calls 323, and 325 are similar to calls 305 and 307 in that they are pass-through calls but without the token. These functional components pass the data on because the module application 125 or in other words the filtering module sits between the calls.

The following pseudocode shows exemplary data, such as bag tag event data 323, 325 which may be returned by the bag journey application 131 usually using a REST\JSON API call to the API 129 which in turn passes the data on to the module application 125:

```
{ "events": [
{
  "airport": "CDG",
  "utcDateTime": "01 Aug 2013, 20:29",
  "localDateTime": "02 Aug 2013, 20:29",
  "flightInfo": {
    "outbound": {
      "flightNo": "AF162",
      "dest": "ATL",
      "depSchDate": "01-Aug-13"
    },
    "inbound": {
      "flightNo": "AF162",
      "origin": "CDG",
      "depSchDate": "02-Aug-13"
    },
    "onward": [
      {
        "flightNo": "AF101",
        "dest": "LON",
        "depSchDate": "02-Aug-13"
      },
      {
        "flightNo": "AF675",
        "dest": "ATL",
        "depSchDate": "02-Aug-13"
      }
    ]
  },
  "eventCode": "CHKIN",
  "eventDesc": "Bag Checked-in",
  "pnr": "7YH4H",
  "paxStatus": "B",
  "freqFlyerId": "KL662503",
  "readLocId": "T1HHR",
  "sentToLocId": "T2HBS",
  "stowageDevId": "AKE12345BD",
  "airCompId": "12R",
  "flightLoadInfo": {
    "flightNo": "AF162",
    "flightDate": "01-Aug-13",
    "dest": "LON"
  },
  "rawMsg": "BSM.V/1TORD"
},
{
  "airport": "CDG",
  "utcDateTime": "01 Aug 2013, 20:29",
  "localDateTime": "02 Aug 2013, 20:29",
  "flightInfo": {
```

-continued

```
    "outbound": {
      "flightNo": "AF162",
      "dest": "ATL",
      "depSchDate": "01-Aug-13"
    },
    "inbound": {
      "flightNo": "AF162",
      "origin": "CDG",
      "depSchDate": "02-Aug-13"
    },
    "onward": [
      {
        "flightNo": "AF101",
        "dest": "LON",
        "depSchDate": "02-Aug-13"
      },
      {
        "flightNo": "AF675",
        "dest": "ATL",
        "depSchDate": "02-Aug-13"
      }
    ]
  },
  "eventCode": "EXPTD",
  "eventDesc": "Bag Expected",
  "pnr": "7YH4H",
    "tagType":"0",
  "paxStatus": "B",
  "freqFlyerId": "KL662503",
  "readLocId": "T1HHR",
  "sentToLocId": "T2HBS",
  "stowageDevId": "AKE12345BD",
  "airCompId": "12R",
  "flightLoadInfo": {
    "flightNo": "AF162",
    "flightDate": "01-Aug-13",
    "dest": "LON"
  },
  "rawMsg": "BSM.V/1TORD"
}
]
}
```

It will be appreciated that this data is in an .XML format which uses alpha-numeric data to define key/value pairs. Usually, the received data is stored by the application 125 in a local cache 127.

The module application 125 (within the pre-application module 122) then determines the data authority associated with the received data. This may be done based on the data authority previously defined in the received token. For example, the data authority embedded within the token may be read.

As will be explained in further detail below, the token information is used as a key into the bag trust database or in other words to allow the trust database or store 115, or cached rules 127 to be searched.

At this stage, the accessing entity or data requestor identifier (i.e. customer ID) may be determined or identified at step 205 shown in the flow diagram of FIG. 2, although this step may be performed at an earlier stage in principle.

Subsequently, each of the data elements or items received in the call 325 (such as the bag tag event data previously described is identified, at step 207.

Subsequently, the application 125 performs a GetRules service call 327 to the trust application 107 including the determined data defining the data authority or/and the user identifier, User ID. The call may include the previously described authentication token, because this token includes both the data authority information and the user identifier information or data identifying the data requestor.

Usually, the trust application 107 queries the trust store database 107 to determine the one or more rules which are associated with the data authority and user identifier.

The rules are received back by application 125 in call 324 from the rules database 127 or 115. Optional rule caching may be performed in a memory or storage means.

In any event, the obtained access rules may be searched at step 209 shown in FIG. 2 to determine an appropriate rule for each data element associated with the bag event data. At step 211 a determination is made as to whether there is a rule for the accessing entity or customer identifier or data requestor. If no rule is found, then an access denied message may be returned, at step 219.

Alternatively, if the application 125 determines that there is a rule associated with the accessing entity or data requestor, then, at step 213, the data is filtered according to the rule, at step 213. At step 215, the filtered data elements such as the baggage information is returned to the bag journey user application 121, by way of a call which may be via the trust API endpoint 123. The process ends at step 217, although it will be appreciated that the process may be repeated by the same or a different data requestor who may or may not request data associated with a bag identifier.

The following description provides further detail of the rules and filtering.

Inside the module or application 125, the following functionality is defined in so that the full bag tag event data previously described and shown above is processed according to retrieved rules defined by the data authority.

Table 4 below shows some of the parameters of the data sharing rules.

TABLE 4

Exemplary parameters of the data sharing rules.

| | Description | Example | Default |
|---|---|---|---|
| What | Data category (ISO 19944) including qualifier | ServiceProvider\OperationalData | N\A |
| Who | Data user who can access the data | Partner Airline | N\A |
| When (1) | The stage of the process when data can be shared | Always At Event Station | Always |
| When (2) | A period of time from when the event is generated | Within 72 hours | ? |
| How | The method/channel through which the data is shared. | Secure Workstation | All |
| Why | The purpose of sharing the data | Improve baggage service | Improve baggage service |

The rules comprise a collection of categories that can be shared. Each data element is assigned a category in a hierarchical structure. An example for the data element "PNRAddress" is "CustomerContent\Credentials". Preferably some or all data elements are categorised as close to the root of the hierarchy to prevent complex structures. The rules may allow for filtering by both events and categories.

A mapping is performed between the data categories associated with individual data elements to produce a ranking for each data category.

The rules may define processing the data according to a user trust level and the ranking for each data category. Alternatively, or in addition, the rules may define processing the data according to defined categories associated with each data element. Usually, the rules are stored in a database or memory 127.

In one example, the rules may process the data so that if a data requestor has a trust level of "High", then all of the data elements having an associated ranking of "High", "Medium" or "Low" are returned or made available to the data requestor.

In a further example, the rules may process the data so that if a data requestor has a trust level of "Low", then only the data elements having an associated ranking of "Low" are returned or made available to the data requestor. Data elements having an associated ranking of "Medium" or "High" are not returned or made available to the data requestor.

It will be appreciated that with such a vast quantity of selectable data, ease of use is important. Thus, a user or data provider who provides the data to another user or data requestor, using the functional computer or server 120 and associated database 133 may define which categories or events they wish to share with their most trusted partners and group or associated them at a 'High' level. Alternatively or in addition, the data owner or source of data may define the trust level or ranking associated with each data category.

Similarly, the data provider may define an intermediate level of sharing where 'Medium' can be selected. By default, categories/event not assigned to 'High' or 'Medium' are assigned the lowest level of sharing (Low).

A similar categorisation process of High, Medium or Low, may be used to group a data provider associated customer's partners for applying categories grouping.

Similarly, users or data providers may group or associate their staff into the similar High, Medium or Low levels of sharing.

A further filtering of PII and Customer Sensitive data may also be applied to the response data set.

As previously described, when a user logs in using the application 121 and requests data, the trust application 107 obtains the ranking rules as defined by the requested data's data authority from the trust store 115 by way of the service call 324 to the application 125.

Each of the data elements associated with the data returned by calls 323 and 325 from the application 131 is then categorised High, Medium or Low according to the previously defined categories associated with each data element.

The ranking rules retrieved from the trust store 115 by way of service call allow the application 125 to determine whether or not for any given categorised field, the user may or may not be allowed access to the field's data.

According to one simplified example:

Suppose an administrator entity 101 categorises the event 'SimpleMessage' as 'Operational/General'.

The Data Authority, BA, ranks the category 'Operational/General' as High.

The Data Authority, BA, ranks the User LHR as High and ranked User LGW as Low.

When the User, LHR logs in and requests data belonging to the Data Authority BA, which contains the category 'Operational/General', the ranking rules are obtained and state that the category 'Operational/General' can only be shared with Users who have the ranking of High. LHR has the ranking of High, therefore the data categorised as Operational/General, which includes 'SimpleMessage', is returned.

When the User, LGW logs in and requests data belonging to the Data Authority BA, which contains the category 'Operational/General', the ranking rules are obtained and state that the category 'Operational/General' can only be shared with Users who have the ranking of High. LGW has the ranking of Low, therefore the data categorised as Operational/General, which includes 'SimpleMessage', is masked or omitted.

The following pseudocode provides further detail of how the application 125 may implement this functionality. In this, service calls are indicated in the code preceding a first bracket while the data elements transmitted as part of the service call are contained within the brackets 0, with each different data element being delimited by a comma, and non-functional comments shown after //. The square brackets [ ] indicate that an array of data is returned:

```
1. GetRules (DataAuthority,User)
    a. DataAuthorityRules=TrustDB.GetDataAuthorityRules(DataAuthority)
    b. DataElementsList[ ] =
       TrustDB.DataAuthorityRules.GetViewableDataElements
       (DataAuthorityRules, User)
          i. Level = TrustDB.User.Level //TrustDB.UXI.Level = High
          ii. Categories[ ] = TrustDB.GetCategories(High) //[Operational,
              General,EUII.......]
          iii. Elements1[ ] = TrustDB.GetElements(Categories[ ])
              //[ utcDateTime, flightNo, destination. ....]
          iv. Elements2[ ]= TrustDB.GetOwnElements(User) [stowageDevId]
          v. Elements[ ] = Elements1+Elements2 // utcDateTime,flightNo,
              dest, stowageDevId....]
    c. Returns a list of DataElementsList[ ] //This is the individual fields of
       the BagEvent i.e PaxStatus
```

From this, it will be appreciated that at step a) the rules for the required data authority are determined.

At step b) the data elements list is constructed. This is done by first i) determining a trust level associated with the user. Subsequently, at step ii) the categories for the trust user level is determined. Thirdly, at step iii) a first set of data elements, referred to as Elements1 is constructed using the previously determined categories.

Fourthly, at step iv) a second set of data elements is constructed for the user. Finally, a full set of elements, referred to as DataElementsList, is then constructed by concatenating the first set of data elements and the second set of data elements. This provides a full set of data elements associated with a particular user having a particular trust level.

The filter 125 then parses the response removing any fields that should not be viewable by that particular user. This may be performed according to the following pseudo-code:

```
DataElementsList = Rules(Authority,User)
For each element=BagEvent.element.string( ) if !DataElementsList[ ].
contains(var)
event.element,value = "" //FreqFlyerID = !DataElementList
FreqFlyerID ="" ;
pnr=!DataElementList pnr=""
```

Accordingly, it will be appreciated that the above pseudo-code removes particular values or data elements based upon the trust category. Accordingly, it will be appreciated that the user may have an associated a trust level. Further, each trust level may have one or more associated categories. Further each category may be associated with one or more data elements.

At step 331, the filtered data is returned from the filter to the external API 303, usually by way of a service call 331 to the application 125.

In the specific pseudocode shown below, the frequent flyer number and passenger name record details associated with a particular passenger have been removed, and these are shown in bold enclosed in a rectangle so that they may be easily identified, but it will be appreciated that the bold formatting and rectangular formatting do not usually form part of the returned data:

```
1. Return FilteredData with FF and PNR details removed.
    { "events": [
      {
        "airport": "CDG",
        "utcDateTime": "01 Aug 2013, 20:29,
        "localDateTime": "02 Aug 2013, 20:29,
        "flightInfo": {
          "outbound": {
            "flightNo": "AF162",
            "dest": "ATL",
            "depSchDate": "01-Aug-13"
          },
          "inbound": {
            "flightNo": "AF162",
            "origin": "CDG",
            "depSchDate": "02-Aug-13
          },
          "onward": [
            {
              "flightNo": "AF101",
              "dest": "LON",
              "depSchDate": "02-Aug-13"
            },
            {
              "flightNo": "AF675",
              "dest": "ATL",
              "depSchDate": "02-Aug-13"
            }
          ]
        },
        "eventCode": "CHKIN",
        "eventDesc": "Bag Checked-in",
        "pnr": " ",
        "paxStatus": "B",
        "freqFlyerId": " ",
        "readLocId": "T1HHR",
        "sentToLocId": "T2HBS",
        "stowageDevId": "AKE12345BD",
        "airCompId": "12R",
        "flightLoadInfo": {
          "flightNo": "AF162",
          "flightDate": "01-Aug-13",
          "dest": "LON"
        },
        rawMsg": "BSM.V/1TORD"
      },
      {
        "airport": "CDG",
        "utcDateTime": "01 Aug 2013,20:29,
        "localDateTime": "02 Aug 2013, 20:29,
        "flightInfo": {
          "outbound": {
            "flightNo": "AF162",
            "dest": "ATL",
            "depSchDate": "01-Aug-13"
          },
          "inbound": {
            "flightNo": "AF162",
            "origin": "CDG",
            "depSchDate": "02-Aug-13
          },
          "onward": [
            {
              "flightNo": "AF101",
              "dest": "LON",
              "depSchDate": "02-Aug-13"
            },
            {
              "flightNo": "AF675",
              "dest": "ATL",
              "depSchDate": "02-Aug-13"
            }
          ]
        },
        "eventCode": "EXPTD",
        "eventDesc": "Bag Expected",
        "pnr": " ",
        "tagType":"0",
        "paxStatus": "B",
        "freqFlyerId": " ",
```

-continued

```
        "readLocId": "T1HHR",
        "sentToLocId": "T2HBS",
        "stowageDevId": "AKE12345BD",
        "airCompId": "12R",
        "flightLoadInfo": {
            "flightNo": "AF162",
            "flightDate": "01-Aug-13",
            "dest": "LON"
        },
        "rawMsg": "BSM.V/1TORD"
        }
    ]
}
```

Thus, it will be appreciated that this means that the specific data elements that are not accessible by the user are replaced by " ", which results in less data being transmitted.

Rule Clash

If there are a number of different data authorities associated with the data, the each data authority may define different trust levels for the same data elements.

If the rules associated with each data authority clash, the data authority may resolve the clash using precedent rules. This may be that the most restrictive rule applies. For example, suppose an airport such as London Heathrow, LHR supplies data as to the location of the scanners, scanning Air Canada bags. In this case, AirCanada is the data authority of the passenger information. LHR is the data authority of data related to the Airport Scanners. AirCanada allows Low Trust associates to access all operational data relating to scanning but Heathrow restricts access to geolocation as it is commercially sensitive. Another airport, such as Charles De Gaulle, CDG airport (an Air France low trust associate) may attempt to check on LHR connecting bags on the connecting Air Canada flight. Therefore, CDG tries to access the scanning data. The LHR rule applies as it is more restrictive so CDG does not get access to the LHR scanner location.

Generally airlines are the data authority for their passengers entire journey whereas generally airports are the data authority for events within the airport.

System Configuration

During system configuration, the trust administrator 101 may assign all data events (or fields) to a category, referring to table 1. This data is usually stored in the trust store database 115.

The trust administrator may perform the following actions in order to populate the trust store or data base 115, 127:
1. SetUp—
   a. Performed by an administrator
      i. add the airline or airport data authority (DA) and associated entities,
      ii. add data elements to categories, for example according to Table 1 above
      iii. add owner to data elements, for example according to Table 2 above
      iv. add the categories to the trust levels (TBS) the trust levels are initially:
         1. Partner
         2. High
         3. Medium
         4. Low
         5. StaffL1
         6. StaffL2
         7. StaffL3
   b. An Airline or Airport Administrator or other entity is usually allowed to add Trust Levels
   c. The Airline or Airport Administrator may be able to change the defaults previously set by the data authority (element in categories and which categories can be viewed by the trust levels).
2. SetTrustLevels
   a. The data authority sets the trust level of the configured associated entities
   b. The data authority sets 'when' the data can be for viewed according to trust level or partner type
   c. The data authority can retrieve reports as to who has viewed the data
3. Viewing the data
   a. The associated entities can view the data that has been shared with them
   b. Data that they are not authorised to see is represented by a padlock and a hover over which asks them to contact the data authority.

Further, the data authority (such an airline) grants access to the user or data requestor (such as an airport) by placing the user into a High, Medium or Low ranking. This is achieved by storing data identifying the user and an associated trust level in the database 115. Usually, data identifying a plurality of different users is stored in the database, with each user having an associated category which may be the same or different.

Further, also stored in the database 115 is the data defining one or more data categories, with each category being associated with a ranking according to the same High, Medium or Low ranking associated with the user.

From the foregoing, it will be appreciated that the system, device and method may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. A computer processing device for data processing, the device comprising:
   one or more processors; and
   memory coupled with the one or more processors, the memory storing executable instructions that when executed by the one or more processors cause the one or more processors to effectuate operations comprising:
   receiving a requestor identifier associated with a data requestor and a search key;
   determining, based on the requestor identifier, a trust level associated with the data requestor;
   obtaining a plurality of access rules associated with one or more data elements of a plurality of data elements, wherein the one or more data elements are associated with the search key and the plurality of access rules are received from a plurality of data authorities;
   determining a rule clash between at least two of the access rules;
   determining, based on the rule clash, a most restrictive rule of the at least two access rules;
   receiving, based on the most restrictive rule, the one or more data elements associated with the search key;
   determining a data category associated with each data element of the one or more data elements associated with the search key, wherein each data category has an associated ranking; and
   constructing, based on the ranking associated with each data category and the trust level associated with the data requestor, a set of data elements for the data requestor from the received one or more data elements, wherein one or more values associated with a data element are removed from data returned to the data requestor based on the determined ranking associated with each data category and the determined trust level associated with the data requestor.

2. The computer processing device according to claim 1, wherein the operations further comprise receiving a message comprising the plurality of data elements and wherein at least some of the plurality of different data elements are associated with different rankings.

3. The computer processing device according to claim 1, wherein a received message comprises a plurality of data elements associated with an event.

4. The computer processing device according to claim 1, wherein the operations further comprise sending the set of constructed data elements to the data requestor in response to receiving a data request from the data requestor.

5. The computer processing device according to claim 1, wherein the operations further comprise storing a plurality of different data categories in a database and wherein each category is further sub-divided into a plurality of different sub-categories wherein each sub-category further comprises one or more definitions of sub-sets of related data objects.

6. The computer processing device according to claim 1, wherein the operations further comprise storing the one or more data elements wherein each data element has an associated data source field or data owner field defining a party providing the data and wherein the party providing is a system or device associated with an airline or airport.

7. The computer processing device according to claim 1, wherein the operations further comprise transmitting a request, wherein one or more rules stored in a storage medium are determined based on data within the request.

8. The computer processing device according to claim 1, wherein the operations further comprise receiving an authentication token from the data requestor.

9. The computer processing device according to claim 8, wherein the received authentication token is validated.

10. The computer processing device according to claim 1, wherein the operations further comprise distinguishing between different types of requests based on the received data elements and wherein the received data elements are communicated based on the request type.

11. The computer processing device according to claim 1, wherein the operations further comprise filtering data based on an event and a category.

12. The computer processing device according to claim 1, wherein the operations further comprise storing data associated with one or more events wherein each event is defined by one or more data categories and wherein each data category has an associated data owner or data source field.

13. The computing processing device according to claim 1, wherein the operations further comprise:
   assigning, via the plurality data authorities, a data owner to the one or more data elements associated with the search key; and
   preventing the data owner from restricting access to the one or more data elements by the plurality of data authorities.

14. A method for data processing performed by one or more computing devices, the method comprising:
   receiving a requestor identifier associated with a data requestor and a search key;
   determining, based on the requestor identifier, a trust level associated with the data requestor;
   obtaining a plurality of access rules associated with one or more data elements of a plurality of data elements, wherein the one or more data elements are associated with the search key and the plurality of access rules are received from a plurality of data authorities;
   determining a rule clash between at least two of the access rules;
   determining, based on the rule clash, a most restrictive rule of the at least two access rules;
   receiving, based on the most restrictive rule, the one or more data elements associated with the search key;

determining a data category associated with each data element of the one or more data elements associated with the search key, wherein each data category has an associated ranking; and constructing, based on the ranking associated with each data category and the trust level associated with the data requestor, a set of data elements for the data requestor from the received one or more data elements, wherein one or more values associated with a data element are removed from data returned to the data requestor based on the determined ranking associated with each data category and the determined trust level associated with the data requestor.

15. The computer implemented method according to claim 14 further comprising receiving a message comprising the plurality of data elements and wherein at least some of the plurality of different data elements are associated with different rankings.

16. The method according to claim 14, wherein a received message comprises a plurality of data elements associated with an event.

17. The method according to claim 14, further comprising sending the set of constructed data elements to the data requestor in response to receiving a data request from the data requestor.

18. A computer readable product which when executed by a processing device, causes the processing device to effectuate operations comprising:

receiving a requestor identifier associated with a data requestor and a search key;

determining, based on the requestor identifier, a trust level associated with the data requestor;

obtaining a plurality of access rules associated with one or more data elements of a plurality of data elements, wherein the one or more data elements are associated with the search key and the plurality of access rules are received from a plurality of data authorities;

determining a rule clash between at least two of the access rules;

determining, based on the rule clash, a most restrictive rule of the at least two access rules;

receiving, based on the most restrictive rule, the one or more data elements associated with the search key;

determining a data category associated with each data element of the one or more data elements associated with the search key, wherein each data category has an associated ranking; and constructing, based on the ranking associated with each data category and the trust level associated with the data requestor, a set of data elements for the data requestor from the received one or more data elements, wherein one or more values associated with a data element are removed from data returned to the data requestor based on the determined ranking associated with each data category and the determined trust level associated with the data requestor.

* * * * *